United States Patent [19]

Kuntman

[11] 4,189,777
[45] Feb. 19, 1980

[54] GROUND PROXIMITY WARNING SYSTEM WITH MEANS FOR ALTERING WARNING THRESHOLD IN ACCORDANCE WITH WIND SHEAR

[75] Inventor: Daryal Kuntman, S. Pompano Beach, Fla.

[73] Assignee: The Bendix Corporation, Southfield, Mich.

[21] Appl. No.: 901,537

[22] Filed: May 1, 1978

[51] Int. Cl.² ............................................... G01C 5/00
[52] U.S. Cl. .................................... 364/433; 244/182; 244/188; 340/27 AT
[58] Field of Search ............. 364/430, 433; 73/178 R, 73/178 T; 340/27 AT; 343/112 A, 112 CA, 7 TA; 244/180–183, 186, 188

[56] References Cited
U.S. PATENT DOCUMENTS

| 3,327,972 | 6/1967 | Greene | 244/188 |
| 3,715,718 | 2/1973 | Astengo | 343/7 TA |
| 3,946,358 | 3/1976 | Bateman | 364/433 |
| 3,947,808 | 3/1976 | Bateman | 364/433 |
| 3,955,071 | 5/1976 | Lambregts | 244/182 |
| 3,958,218 | 5/1976 | Bateman | 343/7 TA |
| 4,029,271 | 6/1977 | Murphy, et al. | 364/433 |
| 4,043,194 | 8/1977 | Tanner | 340/27 AT |
| 4,060,793 | 11/1977 | Bateman | 244/180 |
| 4,079,905 | 3/1978 | Greene | 244/188 |

*Primary Examiner*—Errol A. Krass
*Attorney, Agent, or Firm*—W. G. Christoforo; Bruce L. Lamb

[57] ABSTRACT

An aircraft air speed signal is differentiated to provide a signal related to rate of change of air speed. This signal is added to a signal related to aircraft barometric altitude change with the sum signal being compared against aircraft radio altitude to generate warning if the aircraft rate of descent is excessive for the conditions encountered.

8 Claims, 5 Drawing Figures

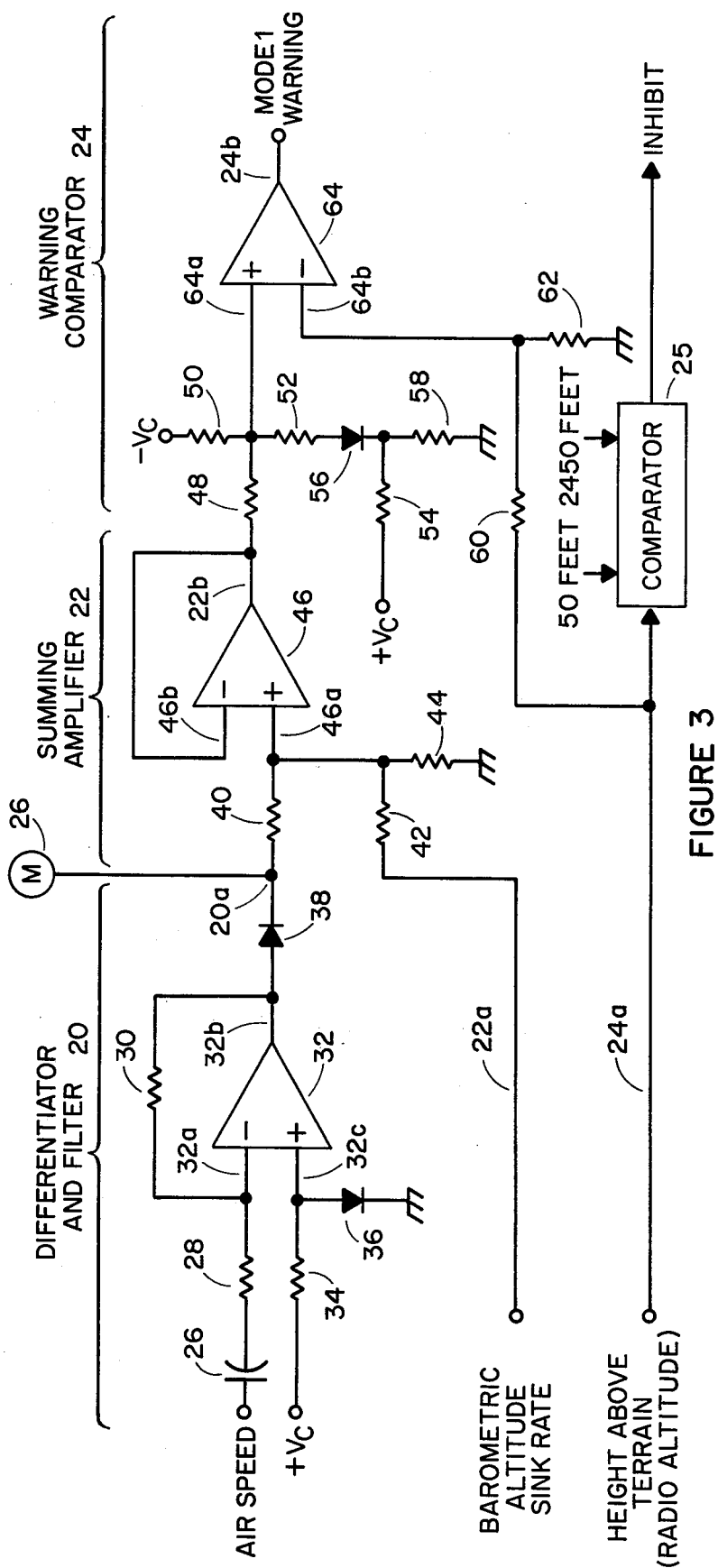
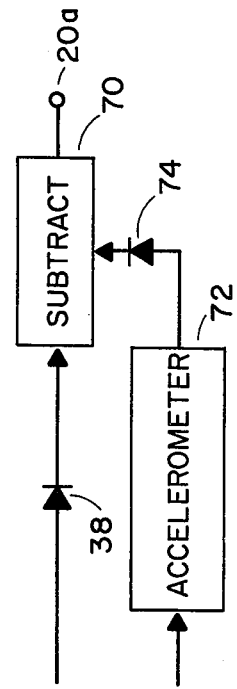
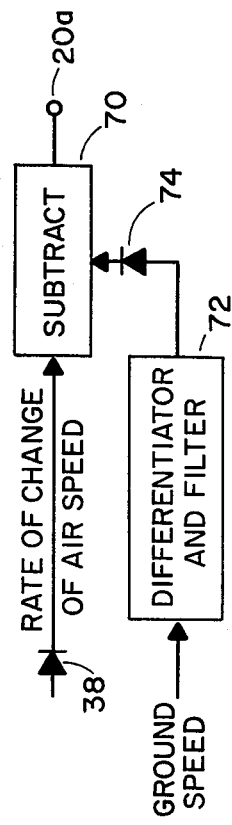

GROUND PROXIMITY WARNING SYSTEM WITH MEANS FOR ALTERING WARNING THRESHOLD IN ACCORDANCE WITH WIND SHEAR

BACKGROUND OF THE INVENTION

This invention relates to ground proximity warning systems, and more particularly to such systems which provide a warning in an aircraft when the aircraft is descending at an excessive rate.

A ground proximity warning system is defined by Federal Aviation Administration (FAA), specification RTCA DO-161A to provide a warning of dangerous imminent contact of an aircraft with ground. The specification defines an operational Mode 1 to provide a warning whenever the aircraft is descending at an excessive rate during approach maneuvers. Briefly, a Mode 1 warning is sounded when the combination of barometric altitude descent rate and height above the ground exceeds a predetermined envelope. The envelope is shown on a graph having barometric altitude sink rate in feet per minute as the abcissa and the height above terrain (ground) in feet as ordinate. The envelope within which the warning is to be sounded is circumscribed by a horizontal line at 50 feet height and three straight line segments. The first segment extends from a point at 50 feet height and about 1,300 feet per minute sink rate to a point at about 1,250 feet height and about 2,200 feet per minute sink rate, a second line segment from the last mentioned point to a point at about 2,450 feet height and about 4,900 feet per minute sink rate and a third segment which is horizontal at about 2,450 feet height.

Wind shear is the manifestation of the meteorological situation wherein an upwelling column of air deflects horizontally outward in all directions from a common locus. An object such as an aircraft passing through a wind shear will experience about a 180 degree wind shift. In particular, an aircraft passing through a wind shear will experience a rapid change in air speed caused by a shift from head-wind to tail-wind conditions. It can be understood that when the aircraft passes through the wind shear the rapid change from head-wind to tail-wind conditions will result in a sudden and substantial loss of lift for the aircraft which may cause excessive aircraft descent rate so that eventually a Mode 1 ground proximity warning system warning will be sounded. In response to such a warning a pilot will increase power to his engines to regain the lost lift. It would be desirable to sound the Mode 1 warning somewhat sooner than would be otherwise normal when the aircraft passes through a wind shear and that the more severe the wind shear, the sooner the warning should be sounded.

SUMMARY OF THE INVENTION

The present invention provides means in combination with a ground proximity warning system for generating a Mode 1 warning alarm at a lower threshold in the thus lowering the Mode 1 warning threshold in proportion to the severity of wind shear.

Briefly, the air speed input signal to the Mode 1 warning circuitry to be described is differentiated and filtered to generate a d.c. voltage proportional to the rate of change of air speed. This signal is added to the signal proportional to barometric altitude sink rate. The signal sum is compared with the radio altitude signal by a Mode 1 warning comparator. The comparator is in fact shaping circuitry or a function generator which determines whether the combined barometric altitude sink rate signal, rate of change of air speed and height above terrain signals are within the Mode 1 warning envelope wherein the envelope threshold is varied in response to the rate of change of air speed. If the combined signals are within the Mode 1 warning envelope, the comparator generates an output signal which activates the ground proximity warning system visual and oral warning in the conventional manner. As known to those skilled in this art, the visual warning can comprise a system of warning lamps in the cockpit while the oral warning can comprise a recorded voice advising the pilot to increase power.

It is an object of this invention to provide an aircraft ground proximity warning system which operates in reponse to a wind shear environment in which the aircraft is flying.

It is another object of this invention to provide improved aircraft ground proximity warning system Mode 1 circuitry which operates in response to rate of change of air speed in addition to barometric altitude sink rate and height above terrain.

It is a further object of this invention to provide ground proximity warning system Mode 1 circuitry having a warning threshold which is lowered in relation to the severity of a wind shear environment in which a carrying aircraft is operating.

These and other objects of the invention will become clear with a reading and understanding of the following descriptions and accompanying drawings wherein:

FIG. 3 is a schematic of the preferred embodiment of the invention.

FIG. 4 shows, in part, another form of the invention.

FIG. 5 shows, in part, a third form of the invention.

DESCRIPTION OF THE PREFERRED EMBODIMENT

Figure 1:
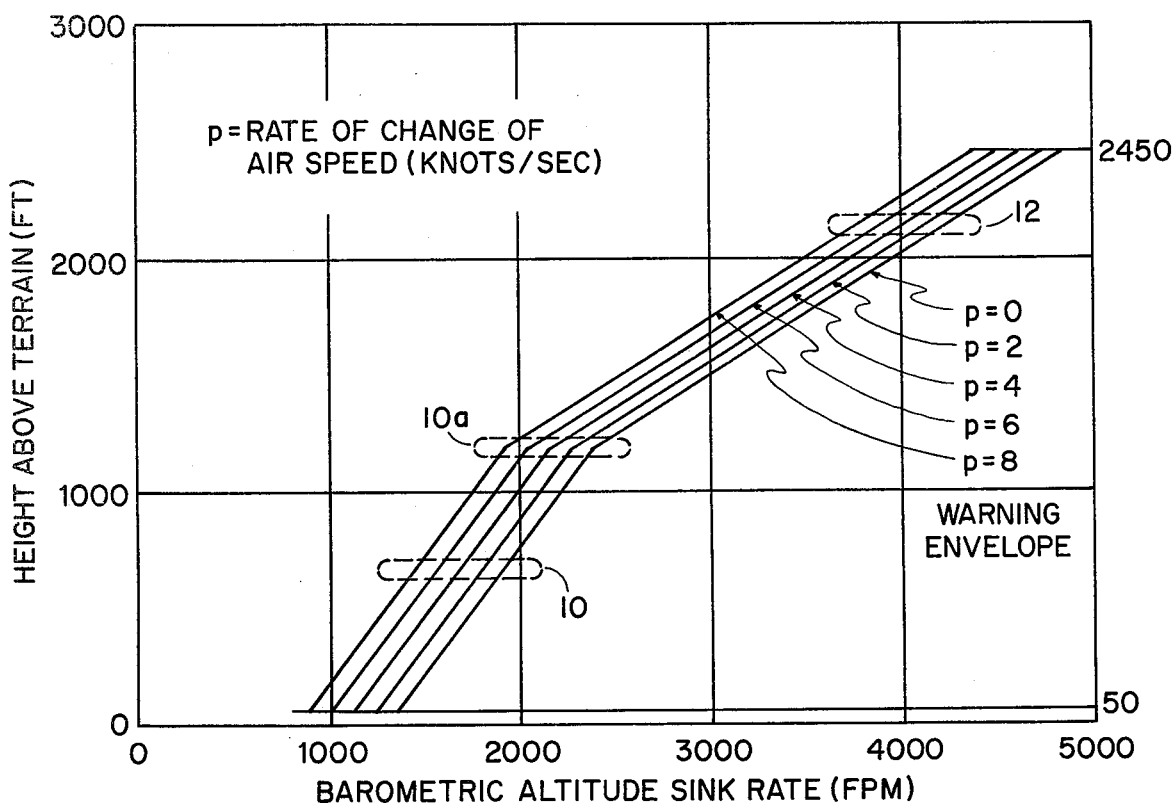
FIG. 1 is a representation of a modified Mode 1 warning envelope as generated by the circuitry of the invention.

Refer first to FIG. 1, which shows the Mode 1 warning envelope mentioned above and described in FAA Specification RTCA EO-161A. The figure additionally illustrates how the warning envelope is increased as the severity of wind shear experienced by an aircraft increases. Specifically, the various envelopes are each input signal related to rate of change of air speed is not required for prior art Mode 1 warning circuitry. However, as an aircraft flies through a region of wind shear so that lift is suddenly lost, it is desirable that a warning from the ground proximity warning system be given earlier than would otherwise be the case. In other words, the warning threshold should be lowered so that the warning is given at a lower barometric altitude sink rate for a given height of aircraft above terrain. This permits the pilot to take timely action to increase aircraft power in light of the presence of dangerous wind shear. The warning threshold is lowered in this embodiment by, in effect, displacing the segmented line curve to the left in proportion to the rate of change of aircraft air speed. In FIG. 1 the lowering of the threshold is illustrated by the representative curves at P=2, P=4, P=6 and P=8 knots per second. Thus, for example, an aircraft having a prior art ground proximity warning system and operating at 1,000 feet above the terrain would be given a Mode 1 warning during take-off maneuvers if the barometric altitude sink rate should exceed about 2,250 feet per minute regardless of the wind shear conditions. However, with the Mode 1 warning circuitry to be described, the Mode 1 warning would be sounded at a barometric altitude sink rate of 2,250 feet per minute only if the aircraft were experiencing no measurable wind shear. If the aircraft were experiencing wind shear so that, for example, P=4 knots per second, then the Mode 1 warning would be sounded at a barometric altitude sink rate of about 2,000 feet per minute according to the present embodiment of the invention.

Figure 2:
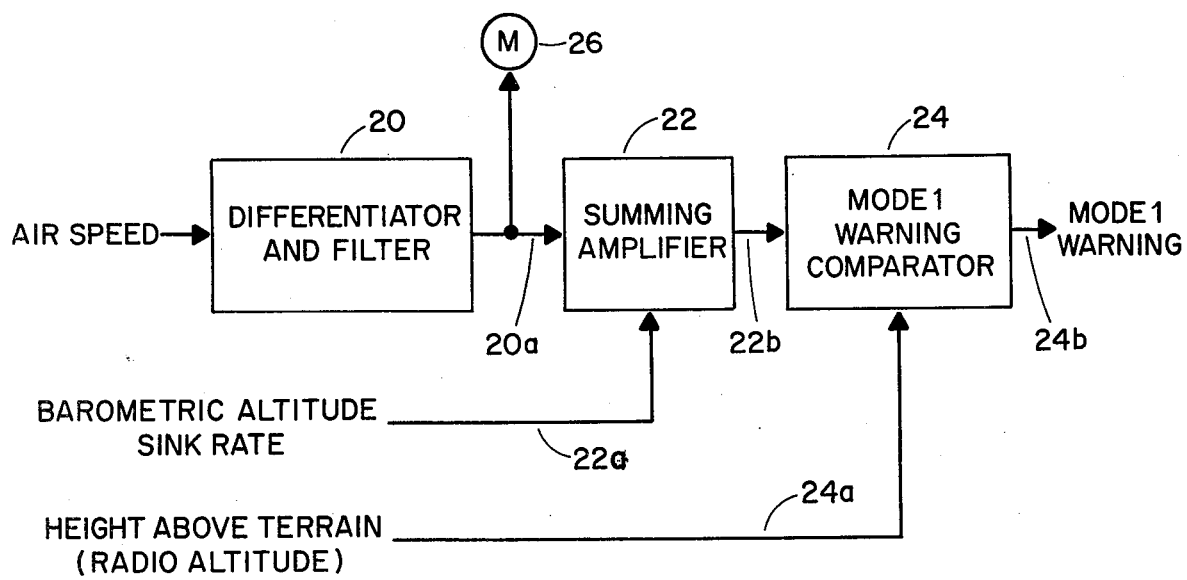
FIG. 2 is a block diagram of the preferred embodiment of the invention.

A block diagram of circuitry used to accomplish the new Mode 1 warning function as illustrated in FIG. 1 is shown in FIG. 2, reference to which figure should now also be made. A signal proportional to aircraft air speed is applied to differentiator and filter 20 to produce at line 20a a signal proportional to rate of change of air speed. Means for generating a signal proportional to aircraft air speed is already in place on most aircraft likely to be equipped with a ground proximity warning system, thus description of such means is not required here.

The signal proportional to rate of change of air speed on line 20a is summed in summing amplifier 22 with a signal proportional to barometric altitude sink rate on line 22a, the sum signal being generated on line 22b. The sum signal is compared against a signal proportional to height of the aircraft above terrain, which is radio altitude, in warning comparator 24. The warning comparator, in essence, generates the functions defined by the appropriate P curve of FIG. 1 as a threshold and determines whether the height above terrain signal exceeds the threshold. If the threshold is exceeded, a signal output is generated on line 24b, which signal output comprises the Mode 1 warning signal. The signal can be applied to the oral and visual devices of the prior art to sound the Mode 1 warning.

Since the signal on line 20a is proportional to the severity or intensity of the wind shear environment in which the aircraft is operating, this signal can be applied, if desired, to a read-out device such as a simple meter 26 to provide a cockpit indication of wind shear intensity.

Refer now to FIG. 3 which is a schematic of the block diagram shown in FIG. 2. As in the earlier figure, the input signals to the Mode 1 warning circuitry comprise signals proportional to air speed, barometric altitude sink rate and height above terrain. The embodiment of these input signals are d.c. voltages proportional to the mentioned parameter. In an aircraft these signals might be generated in other signal formats such as a.c. voltages, syncro or resolver signals or non-linear d.c. voltages. Circuitry for conversion of such signal formats to the d.c. voltages required for the present embodiment is a standard part of ground proximity warning systems, does not comprise the invention and thus need not be discussed here.

With reference to FIG. 3, the air speed signal is applied through capacator 26 and resistor 28 to the inverting input terminal 32a of operational amplifier 32. Terminal 32a is connected via resistor 30 to output terminal 32b. A reference voltage terminal $+V_c$ is connected through resistor 34 to the operational amplifier non-inverting input terminal 32c, which terminal is connected to ground through diode 36. Capacitor 26 and resistor 30 together with operational amplifier 32 comprise differentiator 20. Capacitor 26 and resistor 28 determine the filter time constants of the differentiator. The differentiated and filtered signal is connected through diode 38 to one input tap of summing amplifier 22 and more particularly through resistor 40 to summing point 46a which is the non-inverting input terminal for operational amplifier 46. Diode 38 is provided so that only signals indicative of a decreasing rate of change of air speed are connected to the summing amplifier since only decreasing signals are indicative of the presence of wind shear. In this regard it should be remembered that in flying through a wind shear that a head-wind is first encountered which head-wind rapidly shifts to a tail-wind. Diode 36 is used to compensate the level offset to reference signal $+V_c$ caused by diode 38.

The signal proportional to barometric altitude sink rate on line 22a is connected through resistor 42 to summing point 46a, which is coupled to ground through resistor 44. Summing amplifier 22 is comprised of resistors 40, 42 and 44 together with operational amplifier 46 whose inverting input terminal 46b is shorted to the operational amplifier output terminal 22b. As known to those skilled in the art, the relative gain of the various signals applied to summing point 46a is determined by the relative values of resistors 40 and 42. The summed signals thus are generated at terminal 22b and are applied through resistor 48 to non-inverting input terminal 64a of operational amplifier 64.

Input terminal 64a comprises a junction between resistors 50 and 52 which are serially connected with diode 56 and resistor 58 between reference voltage terminal $-V_c$ and ground. Terminal $+V_c$ is connected through resistor 54 to the common terminal of diode 56 and resistor 58. It should be understood that the voltage terminals +Vc, −Vc and ground comprise a power source.

The signal proportional to height above terrain on line 24a is connected through resistor 60 to inverting input terminal 64b of operational amplifier 64. That input terminal is connected to ground through resistor 62. Resistors 60 and 62 comprise a voltage divider which determine the slope of the initial portion 10 of the curves of FIG. 1.

The operation of warning comparator 24 to generate the warning envelope of FIG. 1 is as stated above as to the initial slope of the various P curves. The breakpoints of the P curves, designated at 10a in FIG. 1 is set by the values of resistors 54 and 58. Resistor 52 determines the differential slope of the various P curves, that is, in effect the slope of segments 12. The altitude (height above terrain) intercept is set by the value of resistors 48 and 50. Assuming for the present that the aircraft is operating at height corresponding to the family of line segments 10, an increase in the signal sum at terminal 64a (of FIG. 3) tends to cause amplifier 64 to generate an output and a decrease in the signal sum at terminal 64a tends to cause amplifier 64 not to generate an output. Note also that it was previously explained that the rate of change of an air speed signal was restricted to only decreasing changes in air speed. Thus, a decrease in the signal related to rate of change of air speed indicating the presence of wind shear will cause the line segments indicated at 10 and 12 of FIG. 1 to move to the left by an amount related to the decrease of the rate of change of air speed signal so as to lower the threshold of the warning envelope.

A simple comparator 25, which is part of the prior art Mode 1 circuitry, is responsive to the height above terrain signal to provide a signal to inhibit the Mode 1 warning signal of FIG. 3 when height above terrain is less than 50 feet or greater than 2450 feet.

It should be noted that the Mode 1 circuitry described above does not have any means of distinguishing between changes of air speed caused by wind shear and control changes initiated by a pilot. In normal aircraft operations pilot control changes are usually smooth, relatively slow changes rather than the relatively rapid air speed changes experienced as an aircraft flies through wind shear. Thus, the rate of change of air speed signal would be relatively small in response to changes initiated by the pilot so that the circuitry described above would not be effected to any great degree. Nevertheless, the effect of pilot initiated changes can be eliminated by subtracting the rate of change of the ground speed from the rate of change of the air speed for a net change caused by wind shear to be added to the barometric altitude sink rate signal. In those aircraft with a ground speed signal available the circuit of FIG. 4, reference to which should now be made, is suitable for eliminating the effects of pilot initiated changes. The circuit of FIG. 4 is interposed between diode 38 and point 20a of FIG. 3 and comprises a differentiator and filter 72, a diode 74 and a subtractor 70. In particular, the ground speed signal is differentiated and filtered by element 72, which can be very similar to the differentiator and filter 20 of FIG. 3, with the resultant signal being related to the rate of change of ground speed. The rate of change of ground speed signal is applied through diode 74 to subtractor 70 together with the rate of change of air speed signal from diode 38. The resultant signal is generated at terminal 20a to be processed by the remainder of the circuit shown in FIG. 3. With respect to diode 74, it should be recalled that as an aircraft passes through a wind shear ground speed will increase suddenly and sharply while air speed will decrease suddenly and sharply, whereas in response to pilot initiated changes air speed and ground speed will change in the same direction. Thus, rate of change of ground speed should be subtracted from rate of change of air speed only when both are of the same sense, indicating a pilot initiated change, and more particularly, since rate of change of air speed is effective only when decreasing, when both signals are decreasing. For this reason diodes 74 is poled identically with diode 38. This also blocks the rate of change ground speed from subtractor 70 while the ground speed is increasing as would occur while the plane is passing through a wind shear.

For those aircraft in which ground speed signal is not available and where it is desired to eliminate the effects of pilot initiated speed changes a longitudinal axis accelerometer of the type known to those skilled in the art can be provided to generate a signal proportional to rate of change of ground speed. Circuitry using a longitudinal axis accelerometer is shown at FIG. 5 and is identical to that shown at FIG. 4, except in this case the differentiator and filter is not required and accelerometer 72 is provided to generate the desired rate of change of ground speed signal.

Having described a preferred embodiment and various modifications thereof of my invention it should now be clear to one skilled in the art that other modifications and alterations may be made without departing from my invention. Accordingly, I claim as my property all that matter falling within the true spirit and scope of the appended claims.

The invention claimed is:

1. A ground proximity warning system for aircraft for generating a warning signal when the aircraft is descending at an excess rate comprising:
   a source of a rate signal proportional to the rate of change of the aircraft air speed;
   a source of a sink signal proportional to the sink rate of said aircraft;
   means for combining the above two signals to generate a composite signal;
   a source of an altitude signal proportional to the height of said aircraft above terrain; and, means comparing said altitude signal with said composite signal for generating said warning signal.

2. The ground proximity warning signal of claim 1 with additional means for inhibiting said warning signal when the height of said aircraft is less than a predetermined amount above the terrain.

3. The ground proximity warning system of claims 1 or 2 wherein said source of said rate signal comprises a source of a speed signal proportional to the air speed of said aircraft and a means for differentiating said speed signal to produce said rate signal.

4. The ground proximity warning system of claim 3 wherein the signals recited comprise d.c. voltage levels.

5. A ground proximity warning system for aircraft for generating an output signal when the aircraft descends at a rate exceeding a threshold whose level is in part set by the height above terrain at which the aircraft is operating, comprising means responsive to the rate of change of air speed of said aircraft for generating a signal related to the intensity of wind shear in which the aircraft is operating and means responsive to the signal related to the intensity of wind shear for lowering the threshold by an amount related to the intensity of wind shear.

6. A ground proximity warning system for generating a warning signal when an aircraft sinks at an excessive rate comprising:
   a source of a first rate signal proportional to rate of change of air speed of said aircraft;
   a source of a second rate signal proportional to the rate of change of ground speed of said aircraft;
   means for subtracting said first rate signal from said second rate signal to generate a third rate signal;
   a source of a sink signal proportional to the sink rate of said aircraft;

means for combining said sink signal and said third rate signal to generate a composite signal; and, means comparing said sink signal with said composite signal for generating said warning signal.

7. The ground proximity warning system of claim 6 wherein said source of a second rate signal comprises an aircraft longitudinal axis accelerometer.

8. A ground proximity warning system of claim 6 including a source of a speed signal proportional to aircraft ground speed and wherein said source of a second rate signal comprises means for differentiating said speed signal.

* * * * *